(12) United States Patent
Xie et al.

(10) Patent No.: US 10,913,078 B2
(45) Date of Patent: *Feb. 9, 2021

(54) ELLIPTICAL AND FUNNEL-SHAPED JET NOZZLE STRUCTURE

(71) Applicant: Shanghai Ocean University, Shanghai (CN)

(72) Inventors: Jing Xie, Shanghai (CN); Yuyan Liu, Shanghai (CN); Jinfeng Wang, Shanghai (CN)

(73) Assignee: Shanghai Ocean University, Shanghai (CN)

( * ) Notice: Subject to any disclaimer, the term of this patent is extended or adjusted under 35 U.S.C. 154(b) by 98 days.

This patent is subject to a terminal disclaimer.

(21) Appl. No.: 16/236,414

(22) Filed: Dec. 29, 2018

(65) Prior Publication Data

US 2019/0168239 A1 Jun. 6, 2019

Related U.S. Application Data

(63) Continuation of application No. PCT/CN2017/117615, filed on Dec. 21, 2017.

(30) Foreign Application Priority Data

Dec. 1, 2017 (CN) .......................... 2017 1 1246824

(51) Int. Cl.
| | |
|---|---|
| *A23L 3/36* | (2006.01) |
| *B05B 1/22* | (2006.01) |
| *A23L 3/00* | (2006.01) |
| *F25D 13/06* | (2006.01) |

(52) U.S. Cl.
CPC ................ *B05B 1/22* (2013.01); *A23L 3/001* (2013.01); *A23L 3/361* (2013.01); *F25D 13/067* (2013.01); *A23V 2002/00* (2013.01); *F25D 2500/02* (2013.01)

(58) Field of Classification Search
CPC ... F25D 25/04; F25D 3/11; F25D 3/10; F25D 2400/30; F25D 17/06; F25D 13/06
See application file for complete search history.

(56) References Cited

U.S. PATENT DOCUMENTS 4,336,694 A * 6/1982 Schmitt ..................... F25D 3/10
239/568
5,836,166 A * 11/1998 Wardle .................... A23L 3/361
62/63

(Continued)

*Primary Examiner* — Brian M King
(74) *Attorney, Agent, or Firm* — Wayne & Ken, LLC; Tony Hom

(57) ABSTRACT

An elliptical and funnel-shaped jet nozzle structure includes a plurality of elliptical tapered diversion channels, a plurality of elliptical jet nozzles and a conveyer belt. A wall thickness of each of the elliptical tapered diversion channels is 1-5 mm. A wall thickness of each of the elliptical jet nozzles is 1-5 mm. A thickness of the conveyer belt is 1-5 mm. The elliptical tapered diversion channel is a hollow elliptical truncated cone and it includes an upper opening and a lower opening. The upper opening of the elliptical tapered diversion channel is connected to an elliptical opening, and the lower opening of the elliptical tapered diversion channel is connected to an inlet of the elliptical jet nozzle. The elliptical jet nozzle is a hollow elliptical cylinder.

7 Claims, 3 Drawing Sheets

(56) References Cited

U.S. PATENT DOCUMENTS

| | | | | |
|---|---|---|---|---|
| 6,009,719 A | * | 1/2000 | Ochs | A23L 3/361 62/380 |
| 2004/0099005 A1 | * | 5/2004 | Newman | F25D 3/127 62/374 |
| 2010/0162732 A1 | * | 7/2010 | Newman | F25D 3/11 62/52.1 |

* cited by examiner

ELLIPTICAL AND FUNNEL-SHAPED JET NOZZLE STRUCTURE

CROSS-REFERENCE TO RELATED APPLICATIONS

This application is a continuation of International Patent Application No. PCT/CN2017/117615, filed on Dec. 21, 2017, which claims the benefit of priority from Chinese Application No. 201711246824.7, filed on Dec. 1, 2017. The content of the aforementioned applications, including any intervening amendments thereto, are incorporated herein by reference.

TECHNICAL FIELD

The present application relates to quick-frozen food processing machinery, and in particular to an elliptical and funnel-shaped jet nozzle structure.

BACKGROUND

Blast freezers are generally used in frozen food processing, and the impact-type freezer with high convective heat transfer coefficient has become the focus of freezer manufacturers and researchers. The high-speed airflow, originated from the airflow in a plenum chamber released by a nozzle structure, is critically important for a desirable impact effect. The impact effect depends largely on the structure and size of the nozzle structure. The nozzle structure of the existing impact-type freezer usually is a circular orifice plate. However, such structure leads to the problems such as low freezing rate of the frozen products in the freezing area and low uniformity during cooling process.

SUMMARY

In order to solve the above problems, the present application at least provides a jet nozzle of an impact-type freezer.

The present application provides an elliptical and funnel-shaped jet nozzle structure, including a plurality of elliptical tapered diversion channels, a plurality of elliptical jet nozzles and a conveyer belt. A wall thickness of the elliptical tapered diversion channel is 1-5 mm. A wall thickness of the elliptical jet nozzle is 1-5 mm. A thickness of the conveyer belt is 1-5 mm. The elliptical tapered diversion channel is a hollow elliptical truncated cone including an upper opening and a lower opening. The area of the upper opening is bigger than that of the lower opening. The upper opening of the elliptical tapered diversion channel is connected to an elliptical opening of an orifice plate of a plenum chamber, and the lower opening of the elliptical tapered diversion channel is connected to an inlet of the elliptical jet nozzle. The elliptical jet nozzle is a hollow elliptical cylinder. The plurality of elliptical tapered diversion channels are in a linear arrangement. A distance between two adjacent elliptical tapered diversion channels is 70-90 mm. The distance is a distance between geometric centers of two elliptical sections of the two adjacent elliptical tapered diversion channels. The upper opening of the elliptical tapered diversion channel has an elliptical section with a major axis of 55-65 mm and a minor axis of 40-50 mm, and a height of the elliptical tapered diversion channel is 30-50 mm. An outlet of the elliptical jet nozzle has an elliptical section with a major axis of 15-25 mm and a minor axis of 4-6 mm. The height of the elliptical jet nozzle is 20-40 mm. The conveyer belt is just below the elliptical jet nozzle and a distance between the conveyer belt and the elliptical jet nozzle is 20-40 mm.

In an embodiment, the wall thickness of the elliptical tapered diversion channel is 1-3 mm, the wall thickness of the elliptical jet nozzle is 1-3 mm, and the thickness of the conveyer belt is 1-3 mm.

In an embodiment, the wall thickness of the elliptical tapered diversion channel is 2 mm, the wall thickness of the elliptical jet nozzle is 2 mm, and the thickness of the conveyer belt is 2 mm.

In an embodiment, the distance between the two adjacent elliptical tapered diversion channels is 75-85 mm.

In an embodiment, the distance between the two adjacent elliptical tapered diversion channels is 80 mm.

In an embodiment, the upper opening of the elliptical tapered diversion channel has an elliptical section with a major axis of 60 mm and a minor axis of 45 mm; and the height of the elliptical tapered diversion channel is 40 mm.

In an embodiment, the outlet of the elliptical jet nozzle has an elliptical section with a major axis of 20 mm and a minor axis of 5 mm; and the height of the elliptical tapered diversion channel is 30 mm.

In an embodiment, the distance between the conveyer belt and the outlet of the elliptical jet nozzle is 30 mm.

The present invention can effectively increase the freezing rate of the frozen products and improve the flow field uniformity in freezer during cooling process. This reduces the great difference in the cooling rate of frozen products at different freezer positions during food freezing process, and improves the frozen product quality.

Figure 1:
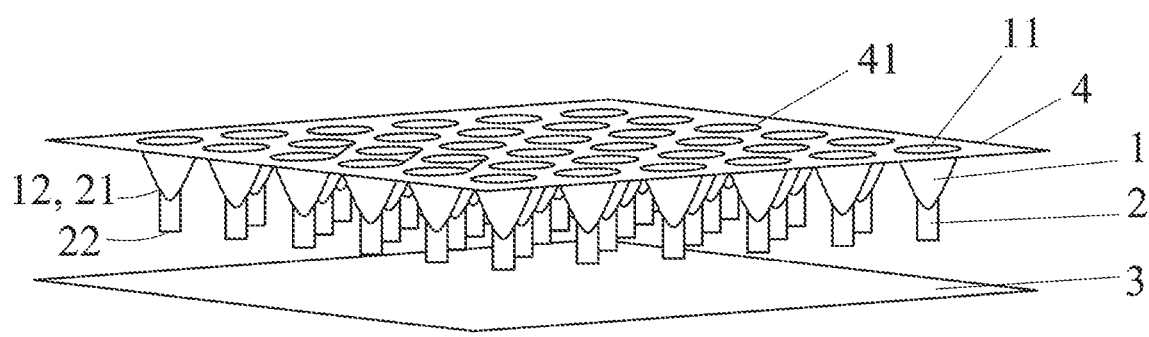
FIG. 1 is a perspective view of an elliptical and funnel-shaped jet nozzle structure of the present invention.

In the drawings: 1, elliptical tapered diversion channel; 11, upper opening; 12, lower opening; 2, elliptical jet nozzle; 21, inlet; 22, outlet; 3, conveyer belt; 4, orifice plate of plenum chamber; 41, elliptical opening.

DETAILED DESCRIPTION OF THE PRESENT INVENTION

The present invention will be further described below in conjunction with specific embodiments to make the process and features clearer.

Figure 2:
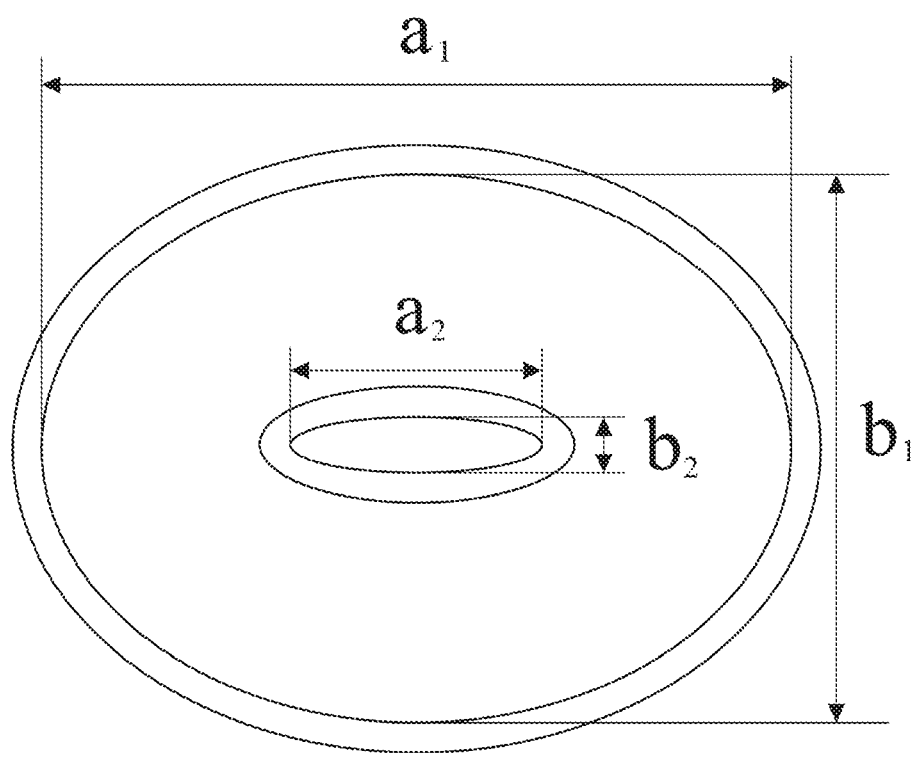
FIG. 2 is a top view of the elliptical and funnel-shaped jet nozzle structure of the present invention.
Figure 3:
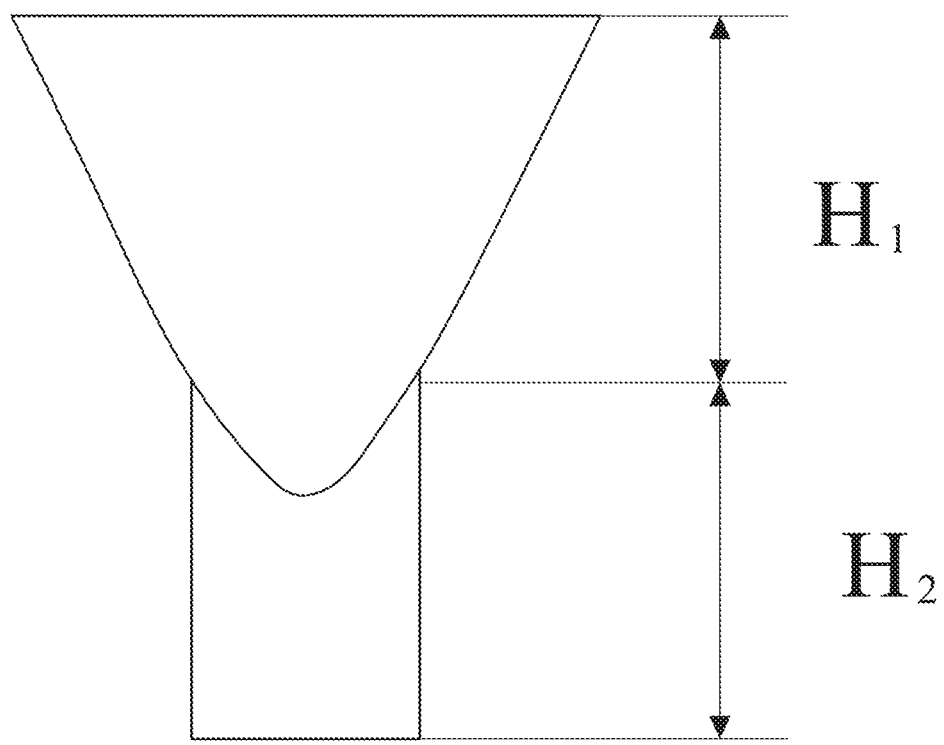
FIG. 3 is a front view of the elliptical and funnel-shaped jet nozzle structure of the present invention.

As shown in FIGS. 1-3, an elliptical and funnel-shaped jet nozzle structure includes a plurality of elliptical tapered diversion channels 1, a plurality of elliptical jet nozzles 2 and a conveyer belt 3. A wall thickness of the elliptical tapered diversion channel 1 is 1-5 mm. A wall thickness of the elliptical jet nozzle 2 is 1-5 mm. A thickness of the conveyer belt 3 is 1-5 mm. The elliptical tapered diversion channel 1 is a hollow elliptical truncated cone and includes an upper opening 11 and a lower opening 12. The upper opening 11 of the elliptical tapered diversion channel 1 is connected to an elliptical opening 41 of an orifice plate 4 of a plenum chamber, and the lower opening 12 of the elliptical tapered diversion channel 1 is connected to an inlet 21 of the elliptical jet nozzle 2. The elliptical jet nozzle 2 is a hollow elliptical cylinder. The plurality of elliptical tapered diversion channels 1 are arranged in a linear arrangement. A distance between two adjacent elliptical tapered diversion channels 1 is 70-90 mm. The distance is a distance between geometric centers of two elliptical sections of the two adjacent elliptical tapered diversion channels 1. The upper opening of the elliptical tapered diversion channel 1 has an elliptical section with a major axis $a_1$ of 55-65 mm and a minor axis $b_1$ of 40-50 mm, and the height $H_1$ of the elliptical tapered diversion channel 1 is 30-50 mm. An outlet of the elliptical jet nozzle 2 has an elliptical section with a major axis $a_2$ of 15-25 mm and a minor axis $b_2$ of 4-6 mm. The height $H_2$ of the elliptical jet nozzle 2 is 20-40 mm. The conveyer belt 3 is just below the elliptical jet nozzle 2. A distance between the conveyer belt 3 and the elliptical jet nozzle 2 is 20-40 mm.

The low-temperature air from an evaporator is drawn by the air blower of the freezer, and then is boosted to flow out. The boosted low-temperature air enters the jet nozzle 2 via the plenum chamber. After being ejected through the jet nozzle 2, the low-temperature air flows out of the outlet 22 of the nozzle structure and enters the evaporator for heat transfer, and then is drawn into the air blower for next cycle.

The present jet nozzle structure can greatly improve the heat transfer on the surface of the conveyor belt 3 and increase the freezing rate of the frozen products as compared to the conventional circular orifice plate structure. Meanwhile, with the significant increase of the flow rate at the nozzle outlet, the flow in the freezing area is improved, leading to the improved evenness during cooling of the frozen products and the improved quality of the frozen products.

Numerical simulation has been performed on the elliptical and funnel-shaped nozzle structure with a plenum chamber of the quick freezer having a size of 600*600*600 mm and an orifice plate 4 having a size of 600*600*2 mm. An conventional orifice plate structure with an elliptical opening is used as a control. Using air as a simulated fluid, assumptions are made as follows: (1) the air is an incompressible fluid; (2) the internal flow field is in a steady state during the normal operation of the model; and (3) the wall of the plenum chamber is insulated. A k-E turbulence model is employed allowing for the energy equations due to a temperature change during impact. Pressure at the boundary of the inlet is $P_{in}$=250 Pa and pressure at the boundary of the outlet is $P_{out}$=0 Pa. An inlet temperature and an outlet temperature in the freezing area are set as 230 K and 235 K, respectively. The conveyor belt has a thermal conductivity of 16.3 W/(m*° C.).

Through numerical simulation, it is preferred that the wall thickness of the elliptical tapered diversion channel 1 is 2 mm; a wall thickness of the elliptical jet nozzle 2 is 2 mm; a thickness of the conveyer belt 3 is 2 mm. The elliptical tapered diversion channels 1 are preferably in a linear arrangement, and the distance between two adjacent elliptical tapered diversion channels 1 is preferably 80 mm. It is preferred that the upper opening 11 of the elliptical tapered diversion channel 1 has an elliptical section with a major axis $a_1$ of 60 mm and a minor axis $b_1$ of 45 mm, and the height $H_1$ of the elliptical tapered diversion channel is 40 mm. It is preferred that the outlet 22 of the elliptical jet nozzle 2 preferably has an elliptical section with a major axis $a_2$ of 20 mm and a minor axis $b_2$ of 5 mm, and the height $H_2$ of the elliptical jet nozzle is 30 mm. The conveyor belt 3 is preferably arranged just below the elliptical jet nozzle 2, and the distance between the conveyer belt 3 and the outlet 22 of the elliptical jet nozzle 2 is preferably 30 mm.

Results of the numerical simulation to the freezing area of the quick freezer indicate that in the case of same area of the nozzle outlet, the surface of the conveyor belt of the elliptical and funnel-shaped nozzle structure has an average Nusselt number of 158.13, and the elliptical nozzle of the conventional orifice plate has an average Nusselt number of 145.31. It can be seen that the average Nusselt number of the elliptical and funnel-shaped nozzle structure is increased by about 8.82%. The elliptical and funnel-shaped nozzle structure can significantly increase the flow area in the cross-flow direction and reduce the cross-flow effect.

The embodiments are merely used to exemplarily illustrate but not to limit the principles and effects of the present invention. Modifications or variations to the above embodiments may be made by those skilled in the art without departing from the spirit and scope of the invention. Therefore, all of the equivalent modifications or variations also fall within the scope of the claims.

What is claimed is:

1. An elliptical and funnel-shaped jet nozzle structure, comprising:
   a plurality of elliptical tapered diversion channels;
   a plurality of elliptical jet nozzle; and
   a conveyer belt;
   wherein a wall thickness of each of the elliptical tapered diversion channels is 1-5 mm; a wall thickness of each of the elliptical jet nozzles is 1-5 mm; and a thickness of the conveyer belt is 1-5 mm;
   the elliptical tapered diversion channel is a hollow elliptical truncated cone comprising an upper opening and a lower opening; wherein the upper opening of the elliptical tapered diversion channel is connected to an elliptical opening of an orifice plate of a plenum chamber, and the lower opening of the elliptical tapered diversion channel is connected to an inlet of the elliptical jet nozzle; and the elliptical jet nozzle is a hollow elliptical cylinder;
   the plurality of elliptical tapered diversion channels are in a linear arrangement, and a distance between two adjacent elliptical tapered diversion channels is 70-90 mm, the distance being a distance between geometric centers of two elliptic sections of the two adjacent elliptical tapered diversion channels; the upper opening of the elliptical tapered diversion channel has an elliptical section with a major axis of 55-65 mm and a minor axis of 40-50 mm; and a height of the elliptical tapered diversion channel is 30-50 mm;
   an outlet of the elliptical jet nozzle has an elliptical section with a major axis of 15-25 mm and a minor axis of 4-6 mm; and a height of the elliptical jet nozzle is 20-40 mm; the conveyer belt is arranged just below the elliptical jet nozzle, and a distance between the conveyer belt and the elliptical jet nozzle is 20-40 mm.

2. The elliptical and funnel-shaped jet nozzle structure of claim 1, wherein the wall thickness of each of the elliptical tapered diversion channels is 1-3 mm; the wall thickness of each of the elliptical jet nozzles is 1-3 mm; and the thickness of the conveyer belt is 1-3 mm.

3. The elliptical and funnel-shaped jet nozzle structure of claim 1, wherein the wall thickness of each of the elliptical tapered diversion channels is 2 mm; the wall thickness of each of the elliptical jet nozzles is 2 mm; and the thickness of the conveyer belt is 2 mm.

4. The elliptical and funnel-shaped jet nozzle structure of claim 1, wherein the distance between the two adjacent elliptical tapered diversion channels is 80 mm.

5. The elliptical and funnel-shaped jet nozzle structure of claim 1, wherein the upper opening of the elliptical tapered diversion channel has an elliptical section with a major axis of 60 mm and a minor axis of 45 mm; and the height of the elliptical tapered diversion channel is 40 mm.

6. The elliptical and funnel-shaped jet nozzle structure of claim 1, wherein the outlet of the elliptical jet nozzle has an elliptical section with a major axis of 20 mm and a minor axis of 5 mm; and the height of the elliptical jet nozzle is 30 mm.

7. The elliptical and funnel-shaped jet nozzle structure of claim 1, wherein the distance between the conveyer belt and the elliptical jet nozzle is 30 mm.

* * * * *